US005429662A

United States Patent [19]

Fillet

[11] Patent Number: 5,429,662

[45] Date of Patent: Jul. 4, 1995

[54] PROCESS AND INSTALLATION FOR THE SEPARATION OF GAS BY PERMEATION

[75] Inventor: Frédéric Fillet, Paris, France

[73] Assignee: L'Air Liquide, Societe Anonyme Pour L'Etude et L'Exploitation des Procedes George Claude, Paris, France

[21] Appl. No.: 117,707

[22] Filed: Sep. 8, 1993

[30] Foreign Application Priority Data

Sep. 14, 1992 [FR] France ................................ 92 10902

[51] Int. Cl.⁶ ................................................ B01D 53/22

[52] U.S. Cl. ........................................... 95/14; 95/17; 95/18; 95/41; 95/45; 95/54; 95/117; 95/141; 96/4; 96/136; 55/267

[58] Field of Search .................... 95/14, 17, 18, 39, 41, 95/45, 54, 117, 141; 96/4, 7, 8, 134, 136, 142; 55/267

[56] References Cited

U.S. PATENT DOCUMENTS

| | | | |
|---|---|---|---|
| Re. 33,678 | 9/1991 | Campbell et al. | 95/39 |
| 4,448,757 | 5/1984 | Barnwell et al. | 95/141 X |
| 4,560,394 | 12/1985 | McDonald et al. | 95/54 |
| 4,781,907 | 11/1988 | McNeill | 95/54 X |
| 4,787,919 | 11/1988 | Campbell et al. | 95/39 |
| 4,881,953 | 11/1989 | Prasad et al. | 95/41 |
| 4,941,893 | 7/1990 | Hsieh et al. | 55/16 |
| 5,032,151 | 7/1991 | Klein et al. | 95/18 |
| 5,102,432 | 4/1992 | Prasad | 95/54 |
| 5,290,341 | 3/1994 | Barbe | 95/54 |

FOREIGN PATENT DOCUMENTS

| | | |
|---|---|---|
| 0358915 | 3/1990 | European Pat. Off. . |
| 0362436 | 4/1990 | European Pat. Off. . |
| 3818919 | 12/1989 | Germany . |
| WO89/06158 | 7/1989 | WIPO . |
| WO92/1366-28 | 8/1992 | WIPO . |

*Primary Examiner*—Robert Spitzer

*Attorney, Agent, or Firm*—Young & Thompson

[57] ABSTRACT

A separation of gas by permeation, comprising the steps of and the apparatus for compressing a gaseous mixture to be separated at a first temperature (Ta) in a compressor (2), cooling to a second temperature (To) the compressed mixture to condense condensable impurities in the compressed gaseous mixture, purifying the compressed gaseous mixture of condensable and/or adsorbable impurities at a third temperature ($T_1$) greater than the second temperature ($T_0$) and passing the purified gaseous mixture into a gaseous permeation unit comprising at least one membrane module to obtain at least one production gas. The third temperature ($T_1$) is so regulated that it will not be less than a first predetermined value. The second temperature (To) is greater than the first temperature (Ta) by a value comprised between 1° and 5° C., the first value being not less than 20° C.

25 Claims, 1 Drawing Sheet

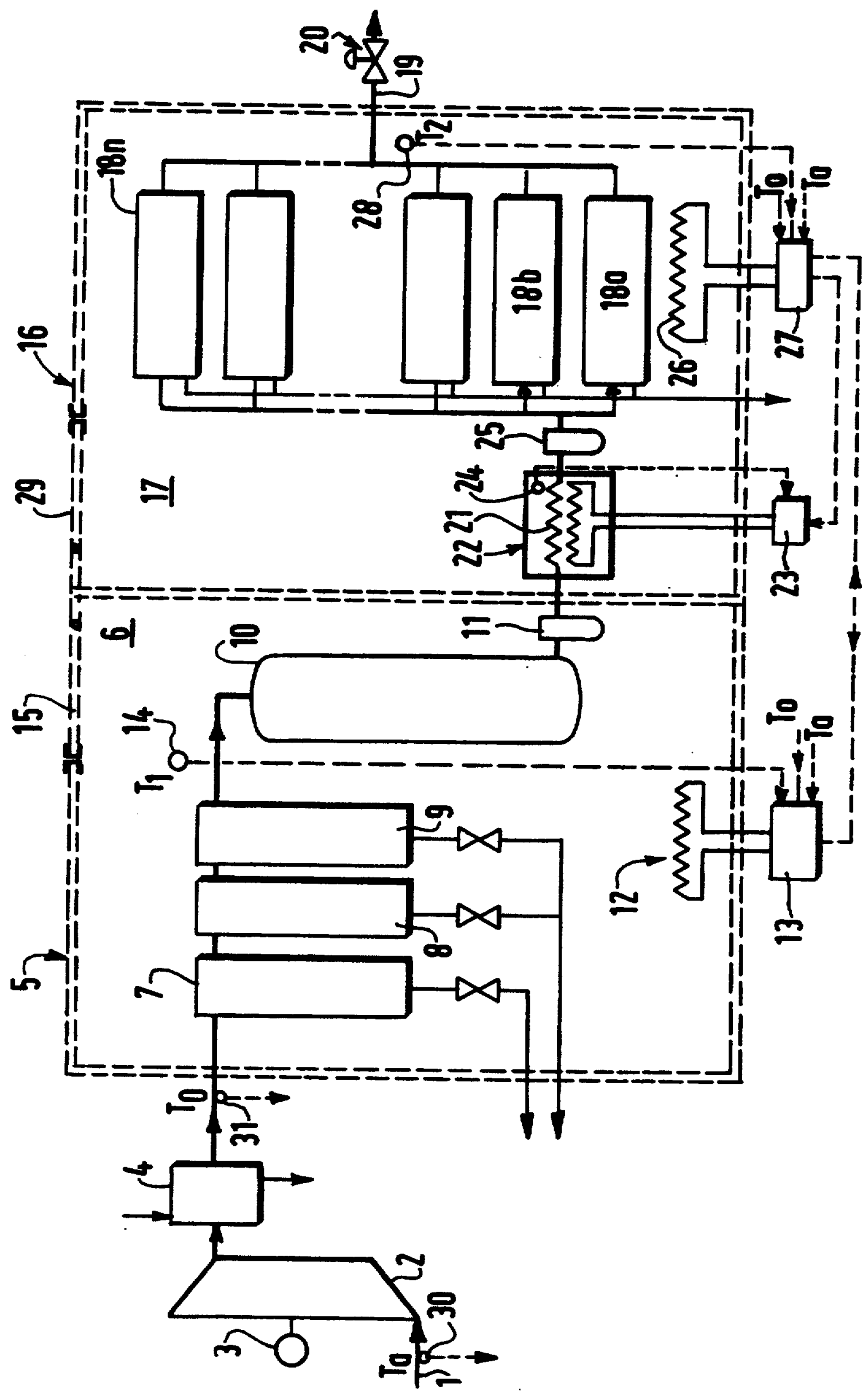
1
2
3
4
5
6
7
8
9
10
11
12
13
14
15
16
17
18n
18b
18a
19
20
21
22
23
24
25
26
27
28
29
30
31
Ta
To
T1
T2

PROCESS AND INSTALLATION FOR THE SEPARATION OF GAS BY PERMEATION

FIELD OF THE INVENTION

The present invention relates to a process for the separation of gas by permeation comprising the steps of:

a) compressing a gaseous mixture to be separated at a first temperature in a compressor;

b) cooling to a second temperature the compressed gaseous mixture to condense condensable impurities in the compressed gaseous mixture;

c) purifying the compressed gaseous mixture of condensable and/or adsorbable impurities at a third temperature higher than the second temperature, and d) passing the purified gaseous mixture into a gaseous permeation unit comprising at least one membrane module to obtain at least one production gas.

BACKGROUND OF THE INVENTION

A process of this type is described in FR-A-2.571.270.

More recently, EP-A-0.362,436 discloses a process in which the permeation is effected in a heated enclosure to limit the condensation, in the membrane module, of condensable components in the gaseous mixture to be separated.

It is known that conventional permeation membranes are very sensitive to traces of impurities carried in the gaseous mixture to be separated, more particularly, in the most frequent case, in which the compressor is of the lubricated type, to traces of lubricating oil, and that the permeation characteristics of the membranes vary considerably with the ambient temperature and that of the gaseous mixture to be separated.

SUMMARY OF THE INVENTION

Applicant has established on the other hand that the filtration of trace impurities, and more particularly traces of lubricating oil, can be effected in a particularly efficacious manner if the condensation of water vapor contained in the gaseous mixture to be separated is prevented.

The present invention has for its object to provide an improved process, simple and reliable to operation, permitting guaranteeing optimum operation of a gas separation installation.

To do this, according to one characteristic of the invention, the process comprises the step of regulating the third temperature such that it will not be less than a first predetermined value, typically not lower than 20° C. and preferably not lower than the higher of the two following temperatures: first temperature + 12° C., second temperature + 5° C., this second temperature typically not exceeding by more than 5° C. the first temperature, typically being itself higher than a value comprised between 1° and 5° C., when an additional atmospheric refrigerant is used at the outlet of an air compressor with integrated refrigerant.

According to another characteristic of the invention, permeation in the permeation unit is effected at a fourth temperature higher than the third temperature, the fourth temperature being typically so adjusted that it will not be less than a second predetermined value typically greater than of a predetermined difference, not less than 5° C., from the first predetermined value, the second predetermined value being in practice not less than 45° C.

According to another characteristic of the invention, the process comprises also the step of substantially heating to the fourth temperature the purified gaseous mixture.

The present invention has for another object to provide an installation for practicing the above process, comprising in series a compressor for the gaseous mixture to be separated, at least one refrigeration station, at least one purification station and at least one membrane module connected to the purification station by a section of a line, in which the purification station is disposed in a first insulated enclosure defining a first chamber containing first heating means connected to the first means for regulation of the temperature in the first chamber.

According to another characteristic of the invention, the membrane module is disposed in a second insulated enclosure defining a second chamber containing second heating means of the second chamber, typically connected to second control means for the temperature in the second enclosure, which comprises preferably third heating means associated with a section of line and connected to third regulation means for the temperature of the gaseous mixture in the section of line.

BRIEF DESCRIPTION OF THE DRAWING

Other characteristics and advantages of the present invention will become apparent from the following description of an embodiment, given by way of illustration but not at all limiting, with respect to the accompanying drawing, in which:

the single FIGURE shows schematically an installation for the separation of gas by permeation according to the invention.

DETAILED DESCRIPTION OF THE INVENTION

In the single FIGURE, a gaseous mixture to be separated, available in pipe 1, in this case atmospheric air, at an ambient temperature Ta, is compressed by a compressor 2, typically a lubricated screw compressor provided with a final refrigeration stage, typically with atmospheric air and driven by a motor 3, at a pressure not exceeding $15 \times 10^5$ Pa absolute and at a temperature typically greater by 10° to 15° C. than the ambient temperature Ta.

The compressed air is cooled in a refrigeration station 4, typically cooled with atmospheric air, to a temperature To not exceeding by more than 5° C. the ambient temperature Ta, typically about 3° C. greater than this latter.

According to one aspect of the invention, the cooled compressed air passes to a purification station disposed in a first insulated enclosure 5, of which all the walls are clad with thermal installation, typically an insulating material of a thickness not greater than 1.8 cm, and defining a first chamber 6 in which are disposed, in series along the compressed air transfer line, a water separating device 7, a prefilter coalescer 8 for the elimination of droplets of oil, a final coalescer 9, a tower 10 with active carbon for the adsorption of oil vapor and a dust filter 11. In the chamber 6 is disposed a heating device 12, typically electrical, controlled continuously by a device 13 for regulation of the temperature $T_1$ in the first chamber 6 receiving signals from a temperature probe 14 in the chamber 6, a temperature probe 30 associated with the inlet of the compressor 2 and a temperature probe 31 associated with the transfer line for the gaseous mixture between the refrigeration station 4 and the enclosure 5. The enclosure 5 comprises a trap 15 giving access by an operator to the chamber 6.

The purified compressed air, at a temperature about $T_1$, passes directly from the first enclosure 5 to a second thermally insulated enclosure 16, analogous to the first enclosure 5 but of dimensions generally greater, defining a second heat insulated chamber 17 in which is disposed at least one, and typically a battery of permeation modules 18*a*, 18*b*. . . 18*n* in parallel, typically not individually thermally insulated and whose production outlets are connected to a production gas conduit 19 provided with a flow regulator valve 20. The line section 21 for supplying the gaseous mixture to the modules passes through a heating device 22 disposed in the chamber 17 and controlled by a control cabinet 23 receiving a signal from a temperature probe 24 associated with the line section 21. A dust filter 25 is disposed at the outlet of the heating device 22.

In the chamber 17 is disposed a heating device 26, typically of the electrical resistance type, controlled by a regulation device 27 receiving signals from a temperature probe 28 in the chamber 17 and probes 30 and 31 and supplying a signal to the device 23. The enclosure 16 comprises an access trap 29 for an operator to the chamber 17.

The operation of the installation is as follows:

The regulation device 13 for the temperature $T_1$ in the first chamber 6 regulates this temperature $T_1$ so that it will be substantially equal to the highest of the three following temperatures:

20° C.,

Ta:+12° C.,

To:+5° C.

The heating device 12 operates continuously, whether or not there is a circulation of compressed air in the installation, so as continuously to maintain, and particularly from commencement of operation of the installation, in the first chamber 6, a sufficiently low temperature to ensure the optimum operation of the de-oiling devices 8–10 and sufficiently high to avoid any condensation of water in these latter.

In like manner, the heating device 26 operates continuously to maintain, in the second chamber 17, and therefore in the modules, a predetermined temperature $T_2$ such as to be substantially equal to the highest of the three following temperatures:

45° C.,

Ta+17° C.,

To+10° C., so as to guarantee operation of the permeation modules at a temperature higher by at least 4° C. than the temperature $T_1$ in the first chamber 6 but at a temperature not exceeding an excessive level, which would give rise to degradation of the performances of the membrane modules.

These optimum operating conditions of the permeation modules are on the other hand guaranteed by the temporary operation, as soon as a flow of compressed air, detected by a pressostat (not shown), reaches the line section 21, of the heating device 22, preferably of the electrical type but which could also use, at least in part, the heat from the oil refrigeration circuit of the compressor 2. The regulation device 23 regulates the temperature of the line section 21 such that it will be identical to temperature $T_2$ imposed moreover by the regulation device 27.

The installation shown in the single figure is adapted particularly to the production, from air, of nitrogen at a purity greater than 95%.

Although the present invention has been described with respect to a particular embodiment, it is not thereby limited but is on the contrary susceptible to modifications and variations which will be apparent to those skilled in the art.

What is claimed is:

1. Process for the separation of gas by permeation, comprising the following steps:

a) compressing a gaseous mixture to be separated at a first temperature in a compressor so as to obtain a compressed gaseous mixture containing condensable impurities;

b) cooling to a second temperature the compressed gaseous mixture to condense condensable impurities in the compressed gaseous mixture;

c) purifying the compressed gaseous mixture of condensable impurities at a third temperature greater than the second temperature so as to obtain a purified gaseous mixtures, and d) passing the purified gaseous mixture into a gaseous permeation unit comprising at least one membrane module to obtain at least one production gas, wherein the third temperature is so regulated that it will not be less than a first predetermined value.

2. Process according to claim 1, wherein the second temperature is greater than the first temperature by a value comprised between 1° and 5° C.

3. Process according to claim 1, wherein the first value is not less than 20° C.

4. Process according to claim 3, wherein the first value is not less than the higher of the two following temperatures:

said first temperature +12° C., said second temperature +5° C.

5. Process according to claim 1, wherein said compressor is lubricated, and said compressed gaseous mixture also contains traces of oil and water, and step c) further comprises the following steps:

$c_1$) purification to remove water, and $c_2$) purification to remove oil.

6. Process according to claim 1, wherein said step d) of permeation is effected at a fourth temperature greater than the third temperature.

7. Process according to claim 6, further comprising the step of regulating said fourth temperature such that it will not be less than a second predetermined value greater than said first predetermined value.

8. Process according to claim 7, wherein the difference between the second value and the first value is not less than 5° C.

9. Process according to claim 8, wherein the second value is not less than 45° C.

10. Process according to claim 6, further comprising the step of heating the purified gaseous mixture substantially to said fourth temperature.

11. Process according to claim 1, wherein the gaseous mixture to be separated is air.

12. Installation for separating gas by permeation, comprising, in series, a compressor for a gaseous mixture to be separated, at least one refrigeration station for the gaseous mixture, at least one purification station for the gaseous mixture and at least one membrane module for the gaseous mixture connected to the purification station by a line section, wherein the purification station is disposed in a first insulated enclosure defining a first chamber containing first heating means connected to first means for regulating the temperature in the first chamber, said at least one membrane module not being thermally insulated but being disposed in a second insulated enclosure defining a second chamber containing second means for heating the second chamber.

13. Installation according to claim 12, wherein the first regulating means comprise a temperature probe in the first chamber.

14. Installation according to claim 12, in which the compressor is lubricated and wherein the purification station comprises at least one coalescing filter and an adsorption device for oil.

15. Installation according to claim 12, wherein the second heating means is connected to second means for regulating the temperature in the second chamber.

16. Installation according to claim 12, wherein the second enclosure encloses third heating means for the line section.

17. Installation according to claim 16, wherein the third heating means are connected to third control means for the temperature of the gaseous mixture in the line section.

18. Installation according to claim 12, wherein the first heating means are electrical.

19. Installation according to claim 12, wherein the second heating means are electrical.

20. Installation according to claim 12, wherein at least the second enclosure comprises means for access of an operator into the second chamber.

21. Installation according to claim 12, wherein the first and second enclosures are adjacent.

22. A membrane separation system comprising a compressor including means for supplying a compressed gas mixture to be separated to at least one membrane separation unit via at least one gas line, the gas line extending serially through at least one cooling zone and at least one cleaning zone including at least one filter means and enclosed within a first insulated enclosure further enclosing cleaning-heating means for carrying out cleaning of the gas mixture at a first temperature, and permeation heating means adjacent the membrane separation unit for carrying out membrane separation of the gas mixture at a second temperature.

23. The membrane separation system of claim 22, further comprising a second insulated enclosure enclosing the membrane separation unit and at least part of the permeation heating means.

24. The membrane separation system of claim 22, wherein the permeation heating means comprises a heater in heat relationship with a portion of the gas line between the cleaning zone and the membrane separation unit.

25. The membrane separation system of claim 22, further comprising control means operatively coupled to the cleaning-heating means and permeation heating means for maintaining a determined temperature difference between the first and second temperatures.

* * * * *